(12) United States Patent
Tsukamoto et al.

(10) Patent No.: US 7,895,375 B2
(45) Date of Patent: Feb. 22, 2011

(54) DATA TRANSFER APPARATUS AND DATA TRANSFER METHOD

(75) Inventors: Nina Tsukamoto, Kawasaki (JP); Sadayuki Ohyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 475 days.

(21) Appl. No.: 11/984,102

(22) Filed: Nov. 13, 2007

(65) Prior Publication Data

US 2008/0195831 A1 Aug. 14, 2008

(30) Foreign Application Priority Data

Feb. 13, 2007 (JP) .............................. 2007-032425

(51) Int. Cl.
*G06F 5/00* (2006.01)
*G06F 9/46* (2006.01)

(52) U.S. Cl. .................. 710/59; 710/5; 710/6; 710/32; 711/113; 711/114; 718/105; 718/106; 709/230; 709/233; 709/238; 712/226; 712/227

(58) Field of Classification Search ........................ None
See application file for complete search history.

(56) References Cited

U.S. PATENT DOCUMENTS

| 5,274,809 | A * | 12/1993 | Iwasaki et al. ............... 718/104 |
| 6,298,407 | B1 | 10/2001 | Davis et al. |
| 6,691,191 | B1 | 2/2004 | Kobayashi et al. |
| 7,003,687 | B2 * | 2/2006 | Matsunami et al. ............. 714/4 |
| 7,552,249 | B2 | 6/2009 | Takahashi et al. |
| 2005/0172097 | A1 | 8/2005 | Voigt et al. |
| 2005/0198553 | A1 | 9/2005 | Okamoto et al. |
| 2006/0106979 | A1 * | 5/2006 | Toshine ....................... 711/112 |
| 2006/0117159 | A1 | 6/2006 | Ohara et al. |
| 2006/0271815 | A1 | 11/2006 | Mizuno et al. |
| 2007/0002482 | A1 | 1/2007 | Daikokuya et al. |
| 2007/0130142 | A1 * | 6/2007 | Daum et al. ................... 707/8 |

FOREIGN PATENT DOCUMENTS

JP 9-114599 5/1997

(Continued)

OTHER PUBLICATIONS

Japanese Office Action mailed Feb. 3, 2009 and issued in corresponding Japanese Patent Application 2007-032425.

*Primary Examiner*—Eron J Sorrell
*Assistant Examiner*—Dean Phan
(74) *Attorney, Agent, or Firm*—Staas & Halsey LLP (57) ABSTRACT

A Direct Memory Access (DMA) controller issues a read request to read data stored in a cache memory and sends a cache controller the read request via a bridge chip. When a response time monitored by a response time monitor exceeds a predetermined time, a status information notification unit obtains a measured value of a throughput from a throughput measuring unit and sends the cache controller a notification of both delay in the response time and the status information of a bus. A suppression instruction counting unit counts the number of suppression instructions, issued from the cache controller, to suppress a read request and sends a suppression control unit a notification of the number of suppression instructions. Then, the suppression control unit indicates a waiting time corresponding to the number of suppression instructions to the DMA controller to perform control to suppress issuance of a read request.

7 Claims, 7 Drawing Sheets

FOREIGN PATENT DOCUMENTS

| | | |
|---|---|---|
| JP | 2001-167048 | 6/2001 |
| JP | 2002-506250 | 2/2002 |
| JP | 2002-169659 | 6/2002 |
| JP | 2004-178169 | 6/2004 |
| JP | 2005-182657 | 7/2005 |
| JP | 2005-222539 | 8/2005 |
| JP | 2005-251042 | 9/2005 |
| JP | 2006-155392 | 6/2006 |
| JP | 2006-178795 | 7/2006 |
| JP | 2006-338064 | 12/2006 |
| JP | 2007-11687 | 1/2007 |

* cited by examiner

DATA TRANSFER APPARATUS AND DATA TRANSFER METHOD

BACKGROUND OF THE INVENTION

1. Field of the Invention

The present invention relates to a data transfer apparatus that includes a plurality of channel adapters each of which issues a read request to read data and a cache controller that returns data in response to a read request, and a data transfer method, and in particular, relates to a data transfer apparatus and a data transfer method with which the equalization of the throughputs of a plurality of channel adapters can be achieved.

2. Description of the Related Art

Recently, as the throughputs of computers have increased, the volume of data used by the computers is growing. Thus, many studies about storages that store a large volume of data have been made. For example, a technique called a Redundant Array of Independent Disks (RAID) for constructing a disk system in which high-speed processing, high capacity, and high reliability are achieved by combining a plurality of hard disk drives has been established.

In a disk system such as a RAID, a disk array apparatus that includes a plurality of disks that store data receives commands from, for example, a host computer that is a host apparatus, and writes and reads data. In this case, in general, data exchanged between the host computer and the disks is cached in a cache memory in the disk array apparatus, and in the subsequent process, the data is read from the cache memory to achieve high-speed processing.

Moreover, an arrangement may be adopted. In the arrangement, in order to efficiently perform data transfer between a host computer and a disk array apparatus, a plurality of channels are provided between the host computer and the disk array apparatus, and a plurality of channel adapters in the disk array apparatus are connected to the host computer. In this case, a plurality of data transfer paths each of which includes a channel adapter are provided between the host computer and a cache memory in the disk array apparatus (for example, see Japanese Patent No. 2567922).

Figure 1:
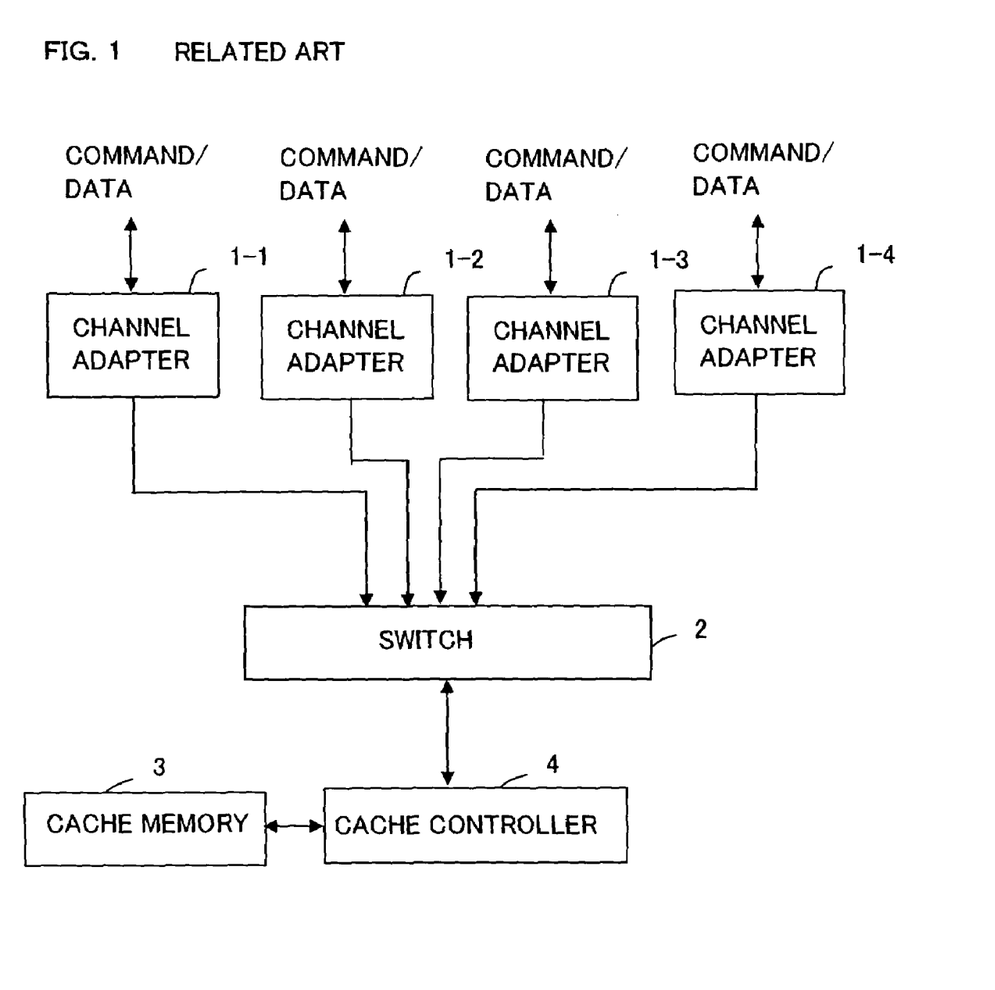
FIG. 1 is a block diagram showing a part of a disk array apparatus according to the related art.

FIG. 1 is a block diagram showing a part of a disk array apparatus in which a plurality of data transfer paths are provided. The disk array apparatus includes a plurality of channel adapters 1-1 to 1-4 each of which exchanges commands and data with a host computer, a switch 2 that converts commands and data that are input from the channel adapters 1-1 to 1-4 into a single output stream, a cache memory 3 that temporarily stores data, and a cache controller 4 that controls data read and write operations in the cache memory 3.

For example, when the host computer sends a command to request reading of data to such a disk array apparatus, the command is received by one of the channel adapters 1-1 to 1-4, and a read request to read the data is sent to the cache controller 4 via the switch 2. Then, the cache controller 4 reads the data from the cache memory 3, and the read data is returned to the one of the channel adapters 1-1 to 1-4, which has sent the read request, via the switch 2 and is finally supplied to the host computer.

Moreover, for example, when the host computer sends a command to request writing of data and the data to be written to the disk array apparatus, the command and data are received by one of the channel adapters 1-1 to 1-4, and a write request to write the data is sent to the cache controller 4 via the switch 2. Then, the cache controller 4 writes the data included in the write request into the cache memory 3, and simultaneously, the data is written to a disk such as a hard disk (not shown).

SUMMARY OF THE INVENTION

A data transfer apparatus according to an aspect of the present invention includes a plurality of channel adapters each of which issues a read request to read data, and a cache controller that returns data in response to a read request. The channel adapters each include a controller for controlling data transfer by issuing a read request, a monitor for monitoring a response time at the time of data transfer controlled by the controller, notification unit for, when the response time monitored by the monitor has reached a predetermined time, sending the cache controller a notification of delay in the response time, and suppression unit for suppressing issuance of a read request in the controller upon receiving a suppression instruction to suppress issuance of a read request from the cache controller after the notification unit sends the notification.

In the present invention, each of the channel adapters controls data transfer by issuing a read request, monitors a response time at the time of data transfer, sends the cache controller a notification of delay in the response time when the monitored response time has reached a predetermined time, and suppresses issuance of a read request upon receiving a suppression instruction to suppress issuance of a read request from the cache controller after the notification is sent. Thus, since issuance of a read request in a channel adapter specified by the cache controller is suppressed and the throughput of the channel adapter decreases, the throughputs of the other channel adapters are improved correspondingly. Accordingly, when the cache controller determines a channel adapter having a relatively high throughput as being a channel adapter subjected to suppression control, the equalization of the throughputs of the plurality of channel adapters can be achieved.

DESCRIPTION OF THE PREFERRED EMBODIMENTS

An embodiment according to the present invention will now be described in detail with reference to the drawings.

Figure 2:
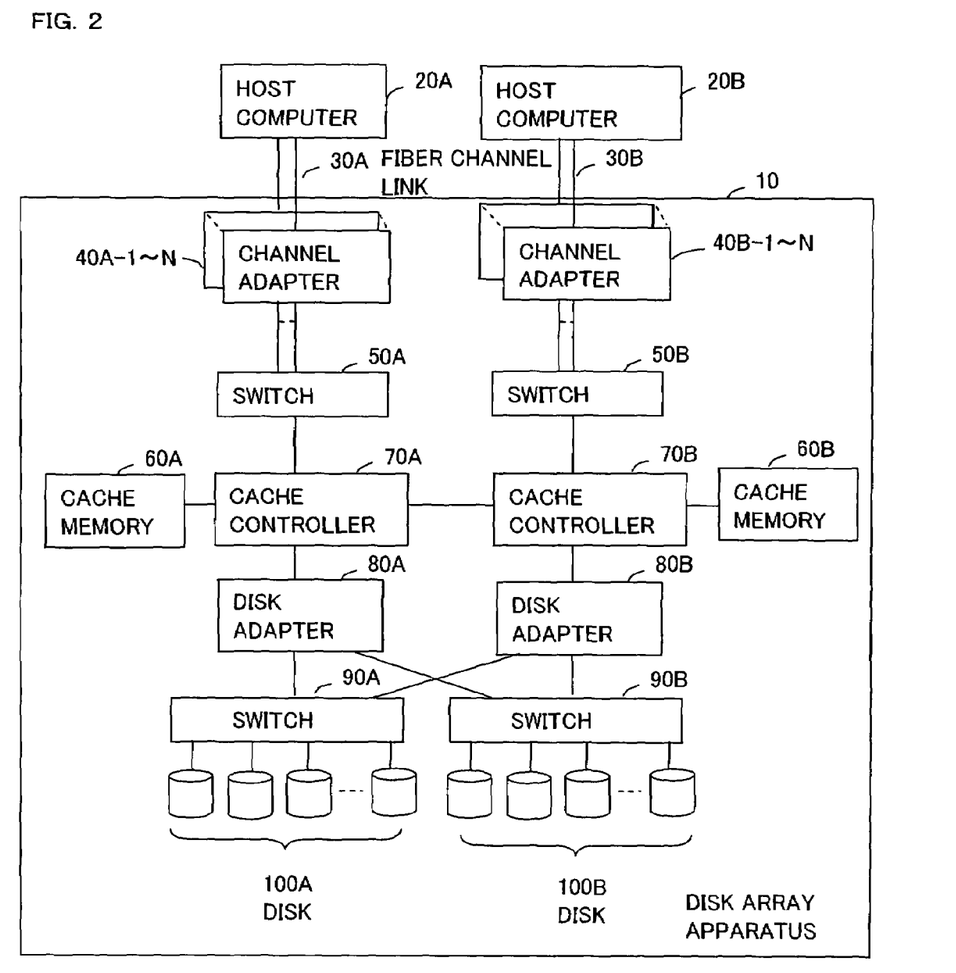
FIG. 2 is a block diagram showing the outline configuration of a disk array apparatus according to an embodiment of the present invention.

FIG. 2 is a block diagram showing the outline configuration of a disk array apparatus 10 according to the embodiment of the present invention. The disk array apparatus 10 is an exemplary computer system to which Direct Memory Access (DMA) is applied. The disk array apparatus 10 is connected to host computers 20A and 20B respectively via fiber channel links 30A and 30B. A redundant configuration is adopted for the disk array apparatus 10 so as to achieve high reliability. The disk array apparatus 10 includes two systems (identified by characters A and B suffixed to reference numerals in the drawing) that include corresponding components. Since the corresponding components in the systems have the same functions, only the components in one of the systems will be described.

The disk array apparatus 10 includes a plurality of channel adapters 40A-1 to 40A-N (N is a natural number equal to or more than two), a switch 50A, a cache memory 60A, a cache controller 70A, a disk adapter 80A, a switch 90A, and disks 100A.

The channel adapters 40A-1 to 40A-N each function as a communication interface that sends and receives data to and from a host computer 20A and include a DMA chip that transfers data by DMA. The channel adapters 40A-1 to 40A-N each monitor the status of a bus that connects to the switch 50A and send the cache controller 70A a notification of the status information of the bus as necessary. Moreover, when the cache controller 70A sends one of the channel adapters 40A-1 to 40A-N an instruction to suppress issuance of a read request, the channel adapter waits for a predetermined waiting time and then issues a read request. The detailed configuration and operation of each of the channel adapters 40A-1 to 40A-N will be described below.

The switch 50A relays read requests and data corresponding to the read requests between the channel adapters 40A-1 to 40A-N and the cache memory 60A. In this case, the switch 50A converts read requests individually input from the channel adapters 40A-1 to 40A-N into a single output stream and relays the output stream to the cache controller 70A.

The cache memory 60A temporarily stores data to be written from the host computer 20A to the disks 100A and data to be read from the disks 100A into the host computer 20A.

The cache controller 70A controls writing and reading of data in the cache memory 60A. For example, the cache controller 70A reads data from the cache memory 60A in response to read requests that are issued by the channel adapters 40A-1 to 40A-N and received via the switch 50A, and returns the read data to the channel adapters 40A-1 to 40A-N. Moreover, when one of the channel adapters 40A-1 to 40A-N sends a notification that the time necessary to receive a response to a read request is delayed to the cache controller 70A, the cache controller 70A requests all of the channel adapters 40A-1 to 40A-N to send the status information of the bus and sends the channel adapters 40A-1 to 40A-N instructions to suppress a read request on the basis of the obtained status information. In this case, the cache controller 70A is connected to a cache controller 70B in the other system with a cache-to-cache link so that data written to the cache memory 60A and a cache memory 60B is shared.

The disk adapter 80A functions as a communication interface that sends and receives data to and from the disks 100A. Specifically, the disk adapter 80A sends data read from the cache memory 60A to the disks 100A and receives data to be written to the cache memory 60A from the disks 100A.

The switch 90A connects the disks 100A and switches the connection between the disk adapter 80A and the disks 100A. The disks 100A include, for example, a plurality of hard disk drives and store data to be written and read in the cache memory 60A.

Figure 3:
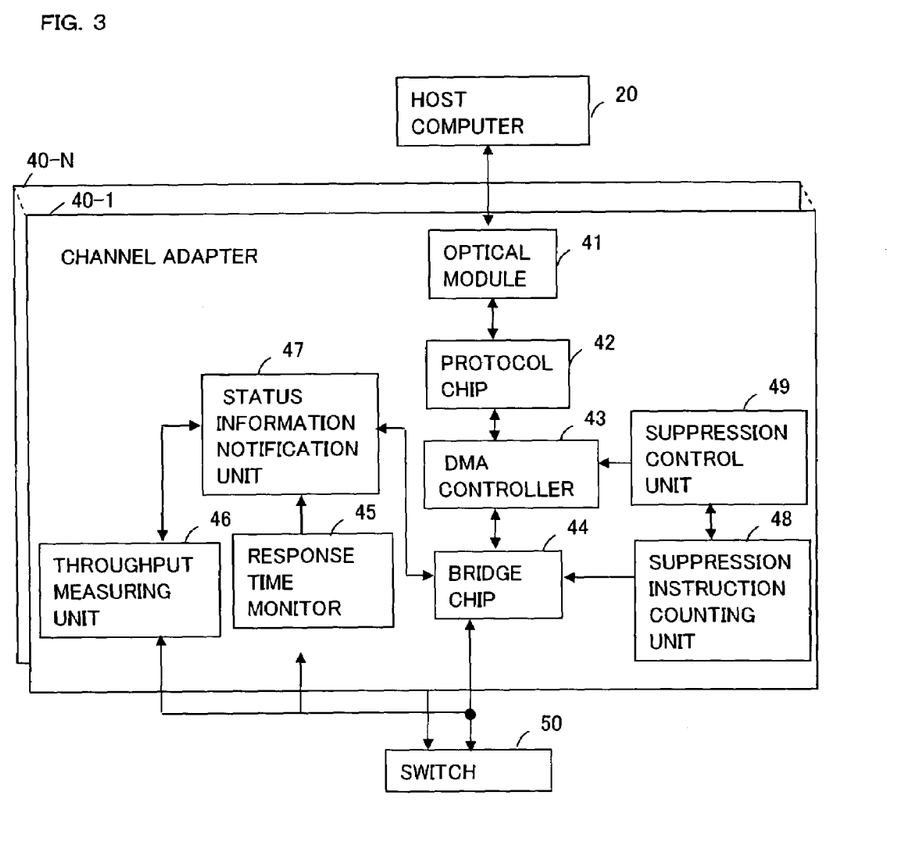
FIG. 3 is a block diagram showing the configuration of a main part of a channel adapter according to the embodiment.

FIG. 3 is a block diagram showing the configuration of a main part of the channel adapter 40-1 according to the present embodiment. In FIG. 3, characters A and B suffixed to reference numerals in FIG. 2 are omitted. For example, the host computers 20A and 20B are represented as the host computer 20. The channel adapter 40-1 includes an optical module 41, a protocol chip 42, a DMA controller 43, a bridge chip 44, a response time monitor 45, a throughput measuring unit 46, a status information notification unit 47, a suppression instruction counting unit 48, and a suppression control unit 49. The configuration of each of the channel adapters 40-2 to 40-N is similar to that of the channel adapter 40-1.

The optical module 41 is connected to the host computer 20. The optical module 41 coverts optical signals sent from the host computer 20 via, for example, an optical fiber to electrical signals, and converts electrical signals output from the protocol chip 42 to optical signals and sends the optical signals to the host computer 20.

The protocol chip 42 is a large-scale integrated (LSI) circuit that controls the protocol of a fiber channel (the fiber channel links 30A and 30B shown in FIG. 2) that is used to connect to the host computer 20. The protocol chip 42 outputs commands and data exchanged between the channel adapter 40-1 and the host computer 20 to the optical module 41 or the DMA controller 43 as electrical signals.

The DMA controller 43 has an interface function of communicating with the cache memory 60 connected to the cache controller 70 and a DMA function. The DMA controller 43 communicates with the cache memory 60 and transfers data by DMA in response to an instruction from a processor (not shown) such as a central processing unit (CPU). For example, the DMA controller 43 issues a read request to read data stored in the cache memory 60 upon receiving, from the host computer 20, a command to read user data, and sends the read request to the cache controller 70 via the bridge chip 44. In this case, when the suppression control unit 49 indicates a waiting time to the DMA controller 43, the DMA controller 43 suppresses issuance of a read request for the indicated waiting time.

The bridge chip 44 is connected to the switch 50. The bridge chip 44 sends a read request issued by the DMA controller 43 to the switch 50 and receives data in response to a read request from the switch 50. Moreover, when the bridge chip 44 has received a request for status information from the cache controller 70, the bridge chip 44 sends the status information notification unit 47 a notification that the request has been received. When the cache controller 70 has sent an instruction to suppress a read request, the bridge chip 44 sends the suppression instruction counting unit 48 a notification that the cache controller 70 has sent the instruction.

The response time monitor 45 monitors a bus that connects the bridge chip 44 to the switch 50 to monitor the response time necessary for data to be returned in response to a read request sent from the bridge chip 44 to the switch 50. When the response time exceeds a predetermined time, the response time monitor 45 sends a notification of the status to the status information notification unit 47.

The throughput measuring unit 46 measures the throughput of the bus, which connects the bridge chip 44 to the switch 50. The throughput measuring unit 46 outputs a measured value of the throughput to the status information notification unit 47 upon receiving a request from the status information notification unit 47. The higher the throughput measured by the throughput measuring unit 46, the larger the volume of data received and sent in the channel adapter 40-1 per unit of time. The lower the throughput, the smaller the volume of data received and sent in the channel adapter 40-1 per unit of time.

When the status information notification unit 47 has received a notification that the response time exceeds the predetermined time from the response time monitor 45, the status information notification unit 47 obtains a measured value of the throughput from the throughput measuring unit 46 and sends the cache controller 70 a notification of the measured value of the throughput together with information stating that the response time is delayed as the status information of the bus via the bridge chip 44 and the switch 50. Moreover, the status information notification unit 47 has received, from the bridge chip 44, a notification that the cache controller 70 has sent a request for the status information, the status information notification unit 47 obtains the measured value of the throughput from the throughput measuring unit 46 and sends the cache controller 70 the measured value of the throughput as the status information of the bus.

The suppression instruction counting unit 48 counts the number of times the cache controller 70 has issued an instruction to suppress a read request and sends the suppression control unit 49 a notification of the number of issued suppression instructions. In this case, the suppression instruction counting unit 48 increments the number of issued suppression instructions only while the suppression control unit 49 performs suppression control for suppressing issuance of a read request, and resets the count when the suppression control is completed. In other words, the suppression instruction counting unit 48 resets the count upon receiving, from the suppression control unit 49, a notification of completion of the suppression control.

When the suppression control unit 49 has received a notification of the number of issued suppression instructions from the suppression instruction counting unit 48, the suppression control unit 49 indicates a waiting time at the time of issuing a read request to the DMA controller 43 so as to perform the suppression control. Specifically, when the number of issued suppression instructions is one, the suppression control unit 49 indicates a predetermined time T to the DMA controller 43 as a waiting time $T_a$. When the number of issued suppression instructions is two, the suppression control unit 49 sets the waiting time $T_a$ to 2 T that is twice as long as that in the case where the number of issued suppression instructions is one. That is to say, when the number of issued suppression instructions is M (M is a natural number), the suppression control unit 49 multiplies the predetermined time T by M and sets the product as the waiting time $T_a$. The suppression control unit 49 starts to measure a suppression time, during which the suppression control is performed, upon indicating the waiting time $T_a$ to the DMA controller 43. Then, when the suppression time has reached a predetermined suppression time $T_b$ without newly receiving a notification of the number of issued suppression instructions from the suppression instruction counting unit 48, the suppression control unit 49 completes the suppression control in the DMA controller 43 and sends the suppression instruction counting unit 48 a notification of the completion of the suppression control.

Figure 4:
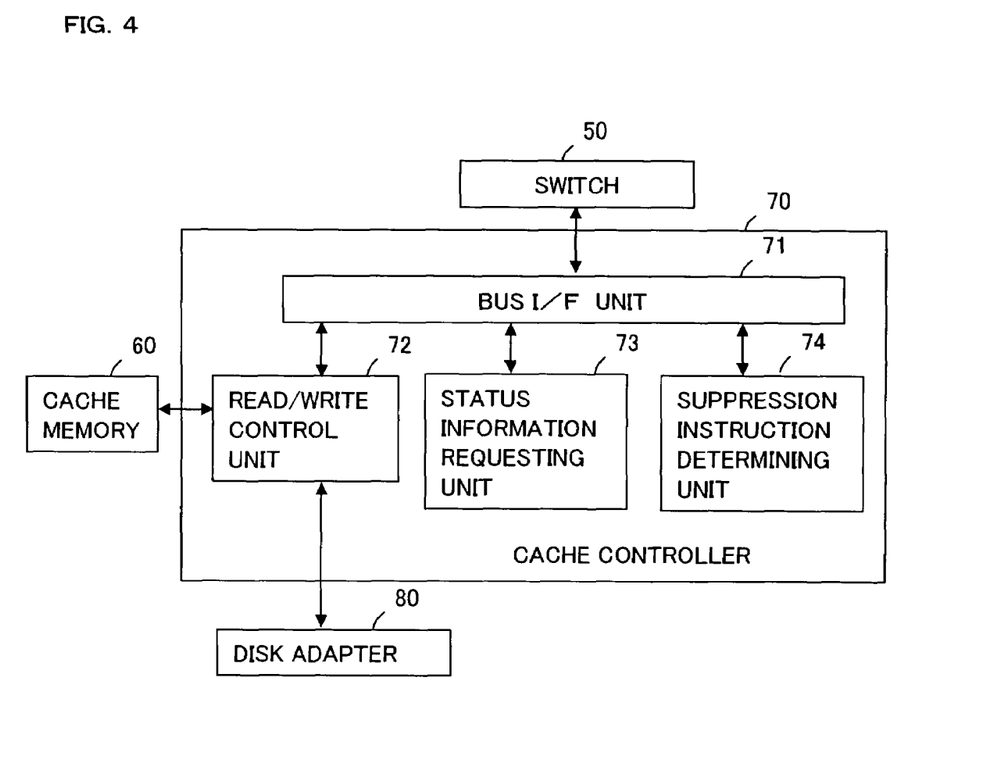
FIG. 4 is a block diagram showing the configuration of a main part of a cache controller according to the embodiment.

FIG. 4 is a block diagram showing the configuration of a main part of the cache controller 70 according to the present embodiment. In FIG. 4, characters A and B suffixed to reference numerals in FIG. 2 are omitted, as in FIG. 3. For example, the switch 50A and a switch 50B are represented as the switch 50. The cache controller 70 includes a bus interface (I/F) unit 71, a read/write control unit 72, a status information requesting unit 73, and a suppression instruction determining unit 74.

The bus I/F unit 71 receives a read request from a bus that connects the switch 50 to the cache controller 70 and sends data in response to a read request. When the status information requesting unit 73 has requested status information, the bus I/F unit 71 sends a status information request to all of the channel adapters 40-1 to 40-N and outputs, to the suppression instruction determining unit 74, status information returned from the channel adapters 40-1 to 40-N. Then, the bus I/F unit 71 sends one of the channel adapters 40-1 to 40-N specified by the suppression instruction determining unit 74 a suppression instruction output from the suppression instruction determining unit 74.

The read/write control unit 72 controls reading and writing of data in the cache memory 60 and transfers data to be written to the disks 100 to the disk adapter 80. Specifically, the read/write control unit 72 reads data from the cache memory 60 in response to a read request received by the bus I/F unit 71 and sends the data to one of the channel adapters 40-1 to 40-N that has sent the read request via the bus I/F unit 71. Moreover, the read/write control unit 72 writes, to the cache memory 60, data to be written to the disks 100 via the disk adapter 80.

When the bus I/F unit 71 has received information stating that the response time is delayed and status information from a first channel adapter out of the channel adapters 40-1 to 40-N, the status information requesting unit 73 sends a request for status information representing the throughput of each of the channel adapters 40-1 to 40-N other than the first channel adapter.

The suppression instruction determining unit 74 determines a channel adapter, subjected to the suppression control, in which a read request is to be suppressed, on the basis of the status information of all of the channel adapters 40-1 to 40-N received by the bus I/F unit 71, and sends a suppression instruction to the determined channel adapter via the bus I/F unit 71. For example, the suppression instruction determining unit 74 determines a channel adapter having a throughput that is equal to or more than a predetermined threshold value or a channel adapter having a throughput that is higher by a predetermined percent than the throughput of a channel adapter that has sent information stating that the response time is delayed as being a channel adapter subjected to the suppression control.

Figure 5:
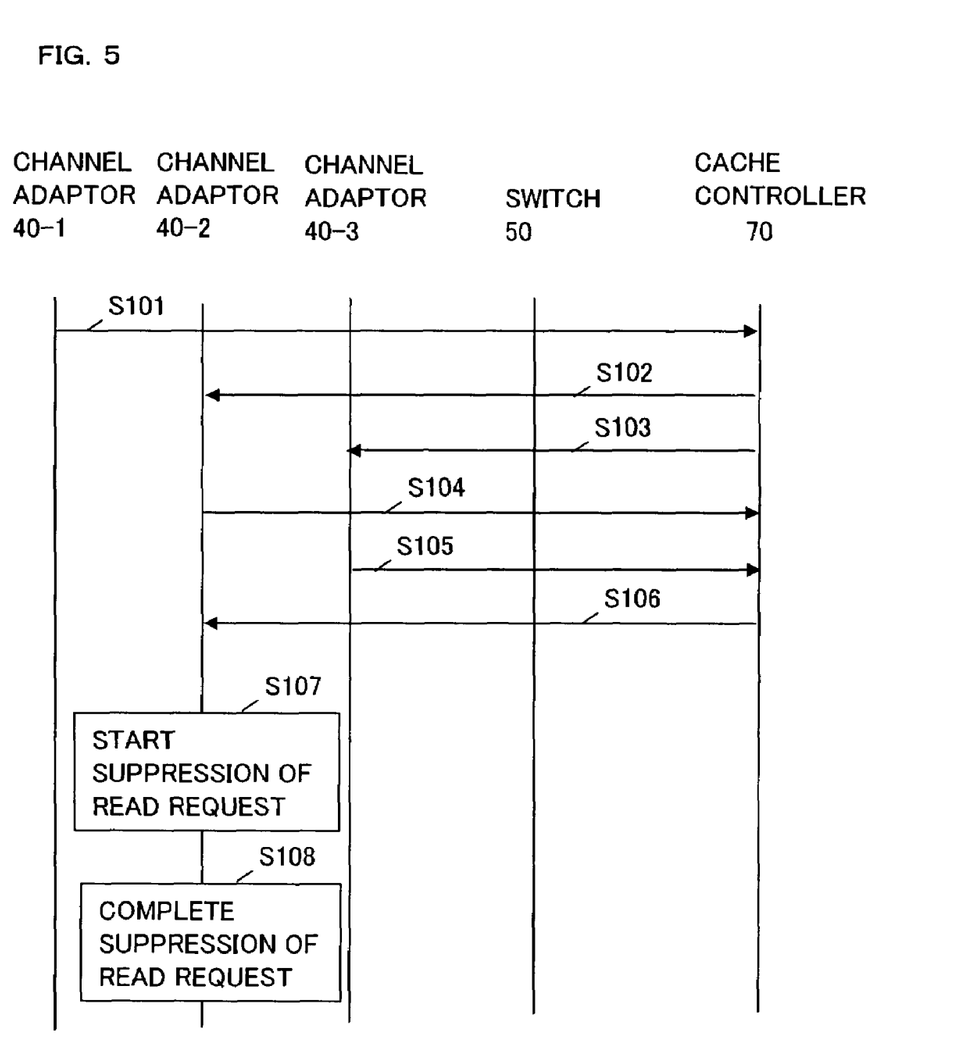
FIG. 5 is a sequence diagram showing the operation of the disk array apparatus according to the embodiment;.

The operations of the channel adapters 40-1 to 40-N and the cache controller 70, constructed as described above, will now be described with reference to a sequence diagram shown in FIG. 5. In FIG. 5, it is assumed that the disk array apparatus 10 includes the channel adapters 40-1 to 40-3.

Each of the channel adapters 40-1 to 40-3 sends a read request to the cache controller 70 so as to read data or sends a write request to the cache controller 70 so as to write data under the control of the DMA controller 43 in response to a command from the host computer 20. Specifically, the read/write control unit 72 in the cache controller 70, which receives a read request and a write request, reads and writes data in the cache memory 60. In this process, in each of the channel adapters 40-1 to 40-3, the response time monitor 45 monitors the response time necessary for data to be returned in response to a read request, and the throughput measuring unit 46 measures the throughput of the bus, which connects the bridge chip 44 to the switch 50.

A case where, in the channel adapter 40-1, the return of data in response to a read request is delayed, so that the response time monitored by the response time monitor 45 reaches a predetermined time, will now be described. In this case, in step S101, the response time monitor 45 in the channel adapter 40-1 sends the status information notification unit 47 a notification that the response time exceeds the predetermined time, and then the status information notification unit 47 obtains a measured value of the throughput measured by the throughput measuring unit 46 and sends the cache controller 70 the measured value of the throughput together with information stating that the response time is delayed as the status information of the bus.

The status information is received by the bus I/F unit 71 in the cache controller 70 via the switch 50. Then, when the status information requesting unit 73 has detected the information stating that the response time is delayed, a status information request is sent to the channel adapters 40-2 and 40-3 other than the channel adapter 40-1. That is to say, a status information request is sent to the channel adapter 40-2 in step S102 and to the channel adapter 40-3 in step S103 via the bus I/F unit 71.

In each of the channel adapters 40-2 and 40-3, which receive the status information request, when the bridge chip 44 has received the status information request, in steps S104 and S105, the status information notification unit 47 obtains a measured value of the throughput measured by the throughput measuring unit 46 and sends the cache controller 70 the measured value of the throughput as the status information of the bus.

Then, the status information is received by the bus I/F unit 71 in the cache controller 70 and output to the suppression instruction determining unit 74. Then, the suppression instruction determining unit 74 determines a channel adapter, subjected to the suppression control, in which issuance of a read request is to be suppressed. For example, the measured value of the throughput included in the status information sent from each of the channel adapters 40-1 to 40-3 is compared with a predetermined threshold value, and then a channel adapter the measured value of the throughput of which is equal to or more than the predetermined threshold value is determined as being a channel adapter subjected to the suppression control. Alternatively, the measured value of the throughput may be compared with the measured value of the throughput of the channel adapter 40-1, which has sent the information stating that the response time is delayed, and then a channel adapter in which a throughput that is higher by a predetermined percent than the throughput of the channel adapter 40-1 has been measured may be determined as being a channel adapter subjected to the suppression control. In short, the suppression instruction determining unit 74 determines a channel adapter having a throughput that is equal to or higher than a predetermined value even when a channel adapter in which the response time is delayed and the throughput is low exists as being a channel adapter subjected to the suppression control.

In this case, for example, when the throughputs of all of the channel adapters 40-1 to 40-3 are low, the channel adapter 40-1, which has sent the information stating that the response time is delayed, may be determined as being a channel adapter subjected to the suppression control. Such a status occurs, for example, when processing load on the cache controller 70 is temporarily too heavy due to exchange of data with the disks 100 via the disk adapter 80 or exchange of data through the cache-to-cache link.

After the suppression instruction determining unit 74 determines a channel adapter subjected to the suppression control, in step S106, a suppression instruction is sent to the channel adapter via the bus I/F unit 71. In this case, it is assumed that the channel adapter 40-2 is determined as being a channel adapter subjected to the suppression control. Thus, a suppression instruction is sent to the channel adapter 40-2 via the bus I/F unit 71.

The transmitted suppression instruction is received by the bridge chip 44 in the channel adapter 40-2, and the suppression instruction counting unit 48 increments the number of issued suppression instructions by one. That is to say, when the suppression control unit 49 is not performing the suppression control, the number of issued suppression instructions becomes one. Then, a notification of the number of issued suppression instructions is sent to the suppression control unit 49, and the suppression control unit 49 determines the waiting time $T_a$ at the time of issuing a read request in response to the number of issued suppression instructions and indicates the waiting time $T_a$ to the DMA controller 43. Then, in step S107, suppression of a read request is started.

When the suppression control unit 49 has indicated the waiting time $T_a$ to the DMA controller 43, the DMA controller 43 increases an interval for issuing a read request by waiting for the waiting time $T_a$ before issuing a read request. This operations reduces the throughput of the channel adapter 40-2, and thus the throughputs of the channel adapters 40-1 and 40-3 can be improved correspondingly. As a result, the response time in the channel adapter 40-1, in which the response time is delayed, can be reduced, and the equalization of the throughputs of the channel adapters 40-1 to 40-3 can be achieved. The suppression control for suppressing a read request will be specifically described below.

Subsequently, when a new suppression instruction is not sent to the channel adapter 40-2 during a period between the time suppression of a read request is started and the time the elapsed time reaches the suppression time $T_b$, in step S108, the suppression control unit 49 sends the DMA controller 43 an instruction to complete suppression of a read request, so that suppression of a read request is completed. In the present embodiment, when the response time in any one of the channel adapters is delayed, only a read request from a channel adapter having a relatively high throughput is suppressed. A write request has no significant effect on increase and decrease in the throughput because data to be written to the cache memory 60 and the like is merely transferred from the channel adapters 40-1 to 40-N to the cache controller 70. In contrast, a read request has a significant effect on increase and decrease in the throughput because data read from the cache memory 60 and the like is returned to the channel adapters 40-1 to 40-N after read requests are sent, and thus the channel adapters 40-1 to 40-N, which have issued the read requests, cannot perform other processing until the data read from the cache memory 60 and the like is returned to the channel adapters 40-1 to 40-N. Thus, in the present embodiment, focusing on a read request that has a significant effect on the throughput, issuance of a read request is suppressed so as to achieve the equalization of the throughputs.

Figure 6:
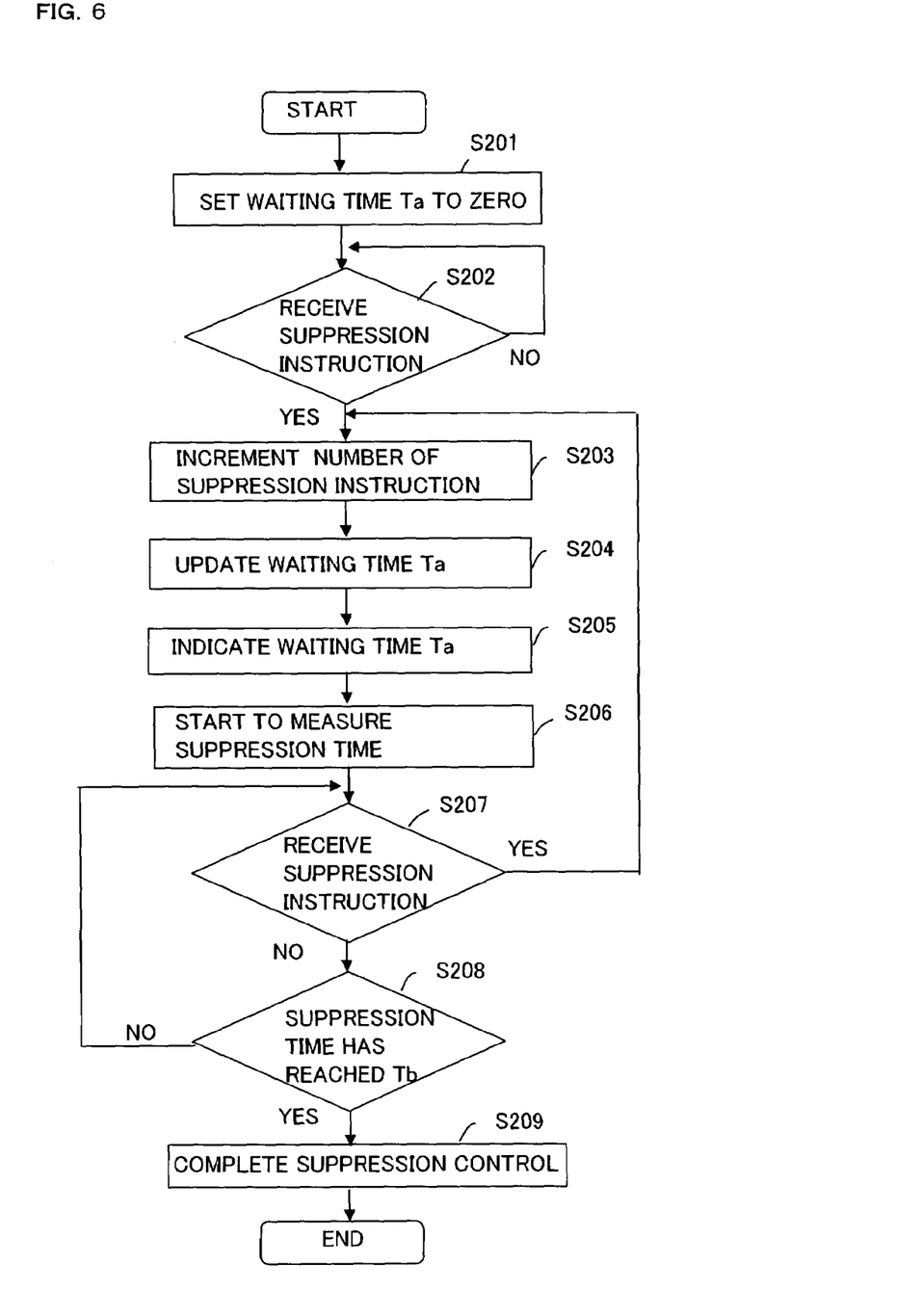
FIG. 6 is a flowchart showing the operation of suppressing a read request according to the embodiment.

The operation of suppressing a read request according to the present embodiment will now be described, using a specific example, with reference to a flowchart shown in FIG. 6.

In the initial status, the suppression control is not performed in any one of the channel adapters 40-1 to 40-N, and in step S201, the suppression control unit 49 sets the waiting time $T_a$ to zero. In this status, the DMA controller 43 issues a read request upon receiving a command from the host computer 20 and receives data corresponding to the read request from the cache controller 70.

When, in response to delay in the response time in any one of the channel adapters 40-1 to 40-N, the status information notification unit 47 sends information stating that the response time is delayed and status information to the cache controller 70, the cache controller 70 obtains the status information of all of the channel adapters 40-1 to 40-N, and the suppression instruction determining unit 74 determines a channel adapter subjected to the suppression control on the basis of the throughputs included in the status information.

Then, the suppression instruction determining unit 74 sends a first suppression instruction to the channel adapter subjected to the suppression control.

In each of the channel adapters 40-1 to 40-N, while a read request is issued, the response time is monitored, and the throughput is measured, in step S202, receipt of a suppression instruction is always, waited for. When the first suppression instruction sent from the suppression instruction determining unit 74 in the cache controller 70 has been received, in step S203, the suppression instruction counting unit 48 increments the number of issued suppression instructions by one. In this case, since the suppression control is not performed in any one of the channel adapters 40-1 to 40-N, the count kept by the suppression instruction counting unit 48 is reset. Thus, in response to the first suppression instruction, the number of issued suppression instructions becomes one. A notification of the number of issued suppression instructions is sent to the suppression control unit 49, and in step S204, the suppression control unit 49 updates the waiting time $T_a$ in response to the number of issued suppression instructions. Specifically, the suppression control unit 49 multiplies the predetermined time T by the number of issued suppression instructions, i.e., one, and sets the product as the waiting time $T_a$.

Figure 7:
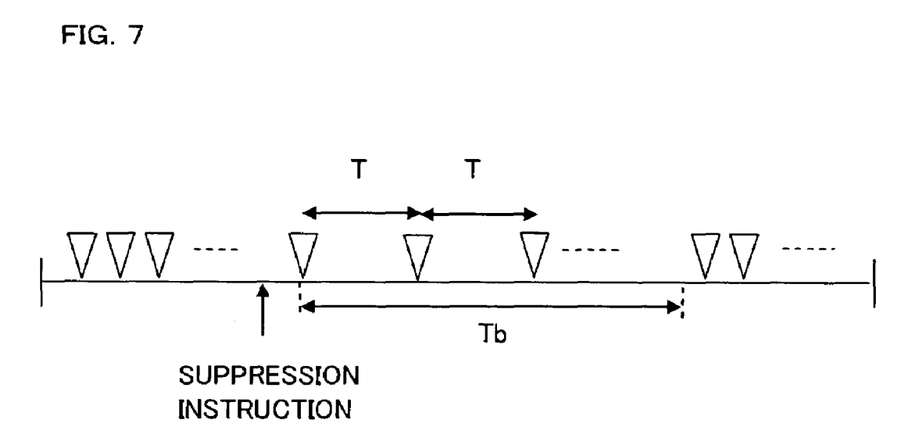
FIG. 7 shows an exemplary operation of suppressing a read request according to the embodiment.

Then, in step S205, the updated waiting time $T_a$ is indicated to the DMA controller 43, and in step S206, the suppression control unit 49 starts to measure the suppression time, during which the suppression control is performed. Subsequently, the DMA controller 43 issues a read request after waiting for the waiting time $T_a$ (=T). In FIG. 7, before the first suppression instruction is issued (the left side of the drawing), the distance between white triangles that indicate issuance of a read request is small, and a read request is issued upon receiving a command from the host computer 20. However, after the first suppression instruction is issued (the right side of the drawing), a read request is issued at intervals of at least the predetermined time T. Thus, the number of read requests issued from the corresponding channel adapter decreases, and the cache controller 70 can process read requests and write requests issued from the other channel adapters. As a result, the throughputs of the other channel adapters are improved, and the equalization of the throughputs is achieved.

Even after such suppression control is started, in step S207, reception of a suppression instruction is continuously waited for. When a second suppression instruction is not newly received, the suppression time is kept being measured, and in step S208, the suppression time is compared with the predetermined suppression time $T_b$. When the suppression time has reached the predetermined suppression time $T_b$, in step S209, the suppression control unit 49 sends the DMA controller 43 an instruction to complete the suppression control, so that the suppression control is completed. At the same time, the suppression control unit 49 sends the suppression instruction counting unit 48 a notification of completion of the suppression control, so that the count kept by the suppression instruction counting unit 48 is reset.

On the other hand, after the suppression control is started, when a second suppression instruction is newly received before the suppression time reaches the predetermined suppression time $T_b$, the process returns to step S203 where the suppression instruction counting unit 48 increments the number of issued suppression instructions by one. At this point, the number of issued suppression instructions already became one in response to the first suppression instruction. Thus, in response to the second suppression instruction, the number of issued suppression instructions becomes two. A notification of the number of issued suppression instructions is sent to the suppression control unit 49, and in step S204, the suppression control unit 49 updates the waiting time $T_a$ in response to the number of issued suppression instructions. Specifically, the suppression control unit 49 multiplies the predetermined time T by the number of issued suppression instructions, i.e., two, and sets the product as the waiting time $T_a$.

Figure 8:
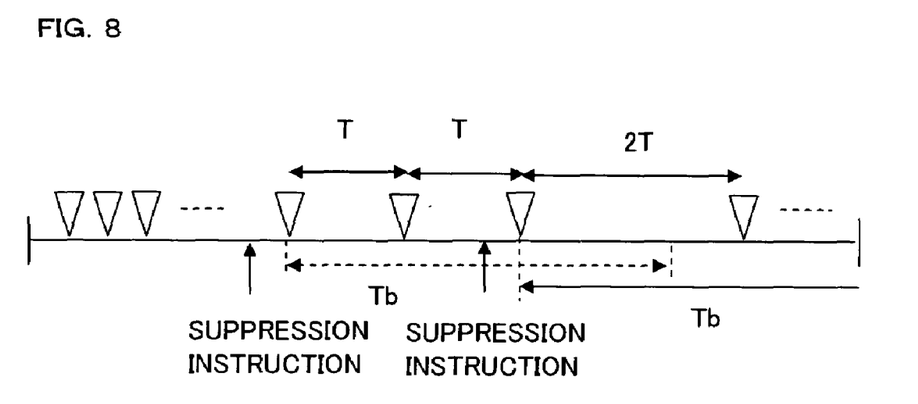
FIG. 8 shows another exemplary operation of suppressing a read request according to the, embodiment.

Then, in step S205, the updated waiting time $T_a$ is indicated to the DMA controller 43, and in step S206, the suppression control unit 49 restarts to measure the suppression time, during which the suppression control is performed. Thus, the suppression time having been measured since the suppression control was started in response to the first suppression instruction is reset, and the suppression time is newly measured from zero. Subsequently, the DMA controller 43 issues a read request after waiting for the waiting time $T_a$ (=2 T). In FIG. 8, when the second suppression instruction is received before the predetermined suppression time $T_b$ elapses after the suppression control in response to the first suppression instruction is started, the waiting time $T_a$ becomes twice as long as the predetermined time T, and this period of time lasts within the predetermined suppression time $T_b$.

Moreover, when a third suppression instruction is received before the predetermined suppression time $T_b$ elapses after the suppression control in response to the second suppression instruction is started, the waiting time $T_a$ becomes three times as long as the predetermined time T, and an interval for issuing a read request becomes longer. Subsequently, a similar process is performed, and every time a new suppression instruction is received during the suppression control, the waiting time $T_a$ becomes longer. Thus, the throughput of a channel adapter subjected to the suppression control decreases, and a decrease in the throughput of the channel adapter contributes to improvements in the throughputs of the other channel adapters. Accordingly, the throughputs of all of the channel adapters 40-1 to 40-N are equalized.

In the present embodiment, channel adapters each monitor the time necessary to receive a response to a read request, and when delay in the response time has reached a predetermined level, a notification of the status is sent to a cache controller. Then, the cache controller obtains the throughputs of all of the channel adapters, determines one of the channel adapters having a relatively high throughput as being a channel adapter, subjected to the suppression control, in which a read request is to be suppressed, and sends a suppression instruction to the determined channel adapter. The channel adapter, which receives the suppression instruction, sets a waiting time at the time of issuing a read request in response to the number of issued suppression instructions so as to suppress issuance of a read request. Thus, the throughput of a channel adapter having a high throughput decreases. This reduces the response time in each of the other channel adapters and improves the throughput. As a result, the equalization of the throughputs of a plurality of channel adapters can be achieved.

In the aforementioned embodiment, the predetermined time T is multiplied by the number of issued suppression instructions, and the product is set as the waiting time $T_a$. However, multiplication is not mandatory, and just the waiting time $T_a$ needs to be increased every time the number of issued suppression instructions increments. Moreover, in the aforementioned embodiment, after the suppression control is started, in a case where a new suppression instruction is not issued, when the predetermined suppression time $T_b$ has elapsed, the suppression control is completed.

Alternatively, when the cache controller 70 does not any longer receive information stating that the response time is delayed from any one of the channel adapters 40-1 to 40-N, the cache controller 70 may send a channel adapter under the suppression control an instruction to complete the suppression control.

What is claimed is:

1. A data transfer apparatus comprising each of a plurality of channel adapters for issuing a read request to read data and a cache controller for returning data in response to the read request:

said channel adapters each including a controller that controls data transfer by issuing the read request, a monitor that monitors a response time at the time of data transfer controlled by the controller, a measuring unit that measures throughput of data sent and received between the each of the channel adapters and the cache controller, a notification unit that sends the cache controller information of the throughput measured by the measuring unit when the response time monitored by the monitor exceeds a predetermined time or when a request of the information of the throughput from the cache controller is received, and a suppression unit that suppresses the issuance of the read request in the controller upon receiving a suppression instruction to suppress the issuance of the read request from the cache controller after the notification unit sends the information of the throughput, the suppression unit including a counting unit that counts the number of the suppression instructions received from the cache controller and suppressing the issuance of the read request for a waiting time corresponding to the number of the suppression instructions counted, the waiting time being obtained by multiplying a predetermined unit of time by the number of the suppression instructions, the cache controller including a receiving unit that receives the information of the throughput sent from each of the channel adapters, a determining unit that determines a channel adapter having the throughput that is equal to or more than a predetermined threshold value on the basis of the information of the throughput received by the receiving unit, and a sending unit that sends the channel adapter determined by the determining unit the suppression instruction to suppress the issuance of the read request.

2. The data transfer apparatus according to claim 1, wherein, after the suppression of the issuance of the read request is started, when the suppression unit does not receive a new suppression instruction within a predetermined time, the suppression unit completes the suppression of the issuance of the read request.

3. The data transfer apparatus according to claim 1, wherein the counting unit resets the count of the number of suppression instructions every time the suppression of the issuance of the read request is completed.

4. The data transfer apparatus according to claim 1, wherein the notification unit sends the information of the throughput measured by the measuring unit with information of delay in the response time.

5. The data transfer apparatus according to claim 1, wherein, when one of the channel adapters has sent the cache controller the information of the throughput, the cache controller requests remaining other channel adapters to send the information of the throughput.

6. The data transfer apparatus according to claim 4, wherein the cache controller sends the suppression instruction to suppress the issuance of the read request to a first channel adapter having a throughput that is higher by a predetermined percent than the throughput of a second channel adapter of the channel adapters that has sent a notification of delay in the response time.

7. A data transfer method of a data transfer apparatus that includes a plurality of channel adapters each of which issues a read request to read data, and a cache controller that returns data in response to a read request, the method comprising, in each of the channel adapters:

monitoring a response time at the time of data transfer controlled by issuance of a read request;

measuring throughput of data sent and received between the each of the channel adapters and the cache controller; and when the response time monitored exceeds a predetermined time or when a request of an information of the throughput from the cache controller is received, sending the cache controller the information of the throughput measured, in the cache controller:

receiving the information of the throughput sent from each of the channel adapters;

determining a channel adapter having the throughput that is equal to or more than a predetermined threshold value on the basis of the information of the throughput received by the receiving; and sending the channel adapter determined by the determining a suppression instruction to suppress the issuance of the read request, in the channel adapter determined by the determining:

upon receiving the suppression instruction to suppress the issuance of the read request from the cache controller, counting the number of the suppression instructions received from the cache controller, and suppressing the issuance of the read request for a waiting time corresponding to the number of suppression instructions counted, the waiting time being obtained by multiplying a predetermined unit of time by the number of suppression instructions.

* * * * *

UNITED STATES PATENT AND TRADEMARK OFFICE
CERTIFICATE OF CORRECTION

| | | |
|---|---|---|
| PATENT NO. | : 7,895,375 B2 | Page 1 of 1 |
| APPLICATION NO. | : 11/984102 | |
| DATED | : February 22, 2011 | |
| INVENTOR(S) | : Tsukamoto et al. | |

It is certified that error appears in the above-identified patent and that said Letters Patent is hereby corrected as shown below:

Column 12, Lines 41-43 in Claim 7, delete "sending the channel adapter determined by the determining a suppression
      instruction to suppress the issuance of the read request, in the channel
      adapter determined by the determining:" and
insert -- sending the channel adapter determined by the determining a suppression
      instruction to suppress the issuance of the read request,
      in the channel adapter determined by the determining: --, therefor.

Signed and Sealed this
Tenth Day of May, 2011

David J. Kappos
*Director of the United States Patent and Trademark Office*